Aug. 18, 1959

R. H. GOOD 2,900,518

CONTINUOUSLY SENSITIVE BUBBLE CHAMBER

Filed June 3, 1958

INVENTOR.
ROBERT H. GOOD
BY
*Roland G. Anderson*
ATTORNEY.

Aug. 18, 1959                R. H. GOOD                2,900,518
                  CONTINUOUSLY SENSITIVE BUBBLE CHAMBER
Filed June 3, 1958                                2 Sheets-Sheet 2

INVENTOR.
ROBERT H. GOOD
BY

ATTORNEY.

United States Patent Office 2,900,518
Patented Aug. 18, 1959

2,900,518

CONTINUOUSLY SENSITIVE BUBBLE CHAMBER

Robert H. Good, Berkeley, Calif., assignor to the United States of America as represented by the United States Atomic Energy Commission Application June 3, 1958, Serial No. 739,633

12 Claims. (Cl. 250—83)

The present invention relates to apparatus for the detection and observation of ionizing radiation, and more particularly to a bubble chamber operable under various degrees of pressure, including atmospheric pressure, and being continuously sensitive to ionizing radiations traversing the sensitive portion of the chamber.

The bubble chamber as heretofore constructed constitutes a device in which nuclear particles are tracked and studied by passing ionizing radiation through a superheated liquid. The radiation, under certain conditions, produces charged vaporization nuclein suitable to the formation of a trail of bubbles, which trail is indicative of particle trajectories, particle interactions, and other phenomena associated with the passage of the radiation through the liquid.

The necessity of having the target liquid in a superheated state for the formation of vaporization nuclei has heretofore imposed the employment of complex compression and decompression apparatus for attaining the superheated state. Such apparatus, in addition to being complex and costly, has the further disadvantage of being able to attain only momentarily the desired superheated state in the liquid by careful cycling of the compression and decompression stages. This means that the observation of nuclear tracks has only been possible during a relatively small proportion of the total chamber operating time, a rather serious limitation as it is costly and time consuming not only to operate a bubble chamber, but particularly expensive to operate at the same time the associated accelerator apparatus which produces the ionizing radiation.

For an appreciation of the complexity of the apparatus used in a conventional bubble chamber to attain the superheated state of the liquid, such as the use of compression and expansion apparatus, associated valves, refrigerant means, etc., reference may be made to The Review of Scientific Instruments, vol. 26, No. 10, October 1955, "Liquid Hydrogen Bubble Chambers" by Douglas Parmentier, Jr. and Arnold J. Schwemin.

Another means of detecting and studying nuclear particles is the cloud chamber, which is essentially a device for maintaining a supersaturated vapor in the nuclear beam path. Of interest relevant to the present invention is the fact that a continuously sensitive diffusion type of cloud chamber has been developed and used in the nuclear detector art for observing particle tracks. It should be noted, however, that a limitation of cloud chambers in general is the relatively small concentration of matter the supersaturated target gas presents for interaction with the ionizing particles, this limitation arising from the requirement that the matter be in gaseous form. The liquid state of the target medium in a bubble chamber presents a denser cross-section for nuclear interactions, and more of the potentially available data can be observed during bubble formation, as the tracks are more sharply defined than in the cloud chamber.

The present invention is an improved, continuously sensitive bubble chamber operable under various pressures, including atmospheric pressure, which apparatus eliminates the hereinbefore described disadvantages associated with bubble chambers used in the past, and possesses the advantage of being continuously sensitive as does the diffusion cloud chamber. The apparatus, moreover, is not restricted by the use of the above-mentioned conpression-decompression counter control devices found in prior bubble chambers, nor does the target liquid need to be in a superheated state.

The invention comprises a vessel in which is contained a liquid medium, the vessel and liquid contents being disposed in the path of the radiation which is to be observed. A cooling element is disposed at one end of the vessel and a heating element is disposed at the other end, both elements being in thermal contact with the liquid. The cooled liquid at the bottom of the vessel is saturated with a gas, the temperature of the gas-saturated liquid being controlled by the coolant element. In one embodiment, tributyrin is saturated with carbon dioxide at a temperature of substantially −78° C. Various other liquid and gas combinations may be used to produce similar results. For example, carbon dioxide may be saturated in a liquid selected from the group: isoamyl acetate, methanol, ethanol, and acetone. Since the solubility of gas in a liquid decreases with increasing temperature, high internal gas pressures are created above the cooling element region of the liquid. Provided no disturbances occur, and no foreign matter is present in the vessel, the dissolved gas will remain in solution and a condition of supersaturation obtains. Ionizing radiation entering the vessel produces nuclei about which dissolution of the gas will occur, such evaporated gas taking the form of visible bubbles which appear in the liquid at points traversed by the radiation. The apparatus remains radiation sensitive as long as provision is made for adding fresh gas-saturated liquid at the cooling element end of the vessel.

It is therefore an object of this invention to facilitate the detection and observation of nuclear particles and other ionizing radiations.

It is an object of this invention to provide a nuclear particle detector of the bubble chamber class which is continuously sensitive.

It is another object of the present invention to provide an improved, simplified, nuclear particle detector of the bubble chamber class, which apparatus may be operable at atmospheric pressure.

It is a further object to provide means whereby ionizing particles and nuclear interactions may be continuously detected.

It is an object of this invention to provide means utilizing a gas saturated fluid for the detection and observation of radiations.

The invention, both as to its organization and method of operation, together with further objects and advantages thereof, will best be understood by reference to the following specification taken in conjunction with the accompanying drawing, in which.

Figure 1:
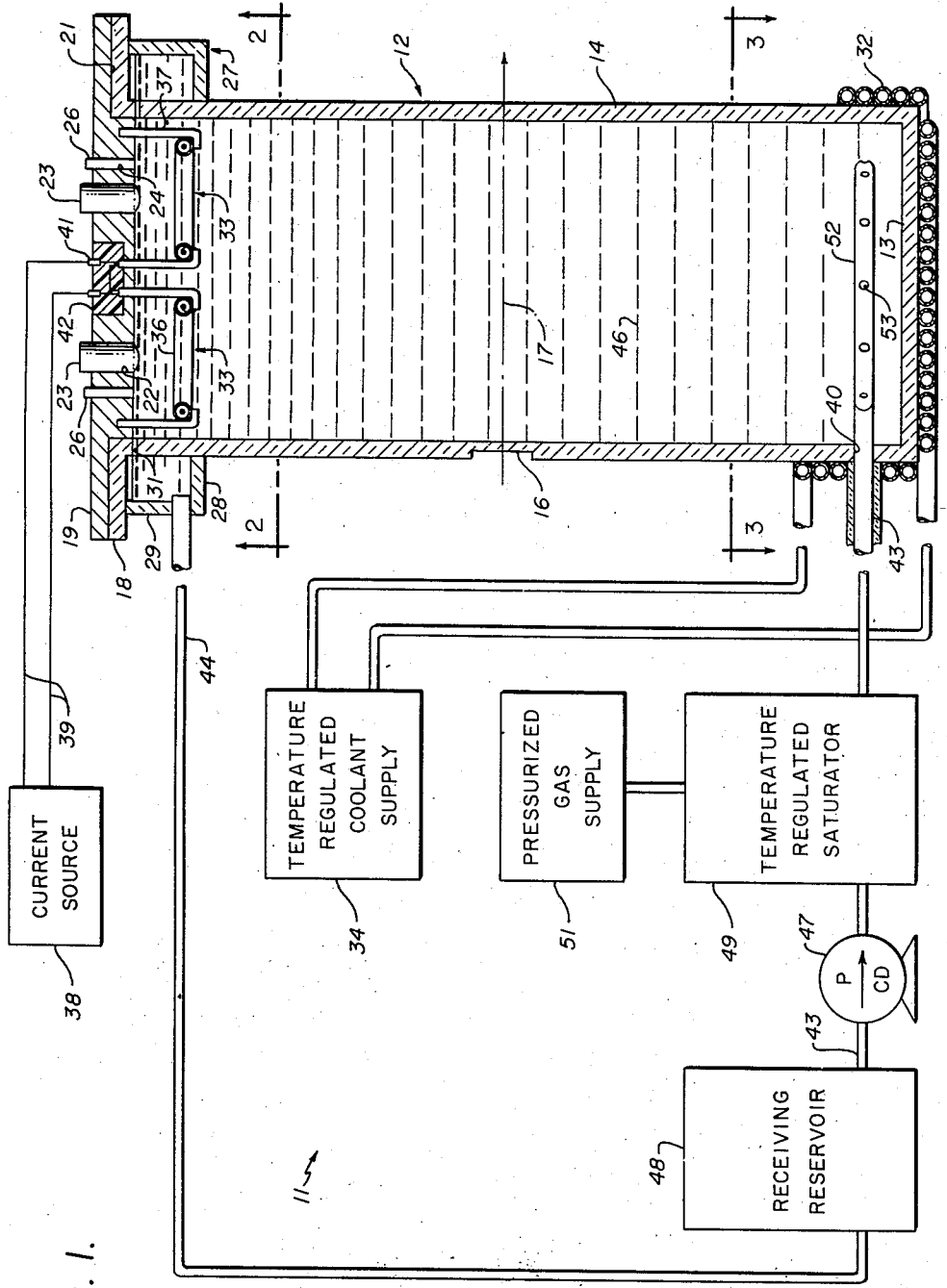
Figure 1 is an elevation section view of the invention with some standard components thereof being shown schematically.

Reference is now made to the drawing for a more detailed discussion and description of the invention and more particularly to Figure 1, wherein there is shown a continuously sensitive bubble chamber 11. The main body of the chamber apparatus 11 comprises an upright, cylindrical vessel 12 having a bottom endwall 13 and sidewall 14, both of which are, in this instance, composed of highly polished glass, although other materials may be used. The materials used, however, should be easily cleaned and should be completely free of foreign particles which could be released into the vessel volume. In addition to providing minimum contamination, glass, being a weak radiation shield for several types of ionizing radiation, provides relatively unimpeded passage for such ionizing radiation into the vessel 12. For those types of ionizing radiation more easily shielded by glass, such as alpha and beta particles, a thin window 16 is provided in a central region of the vessel sidewall 14, which thin portion presents less of a barrier to an ionizing radiation beam 17 entering the vessel 12 at that point.

Figure 2:
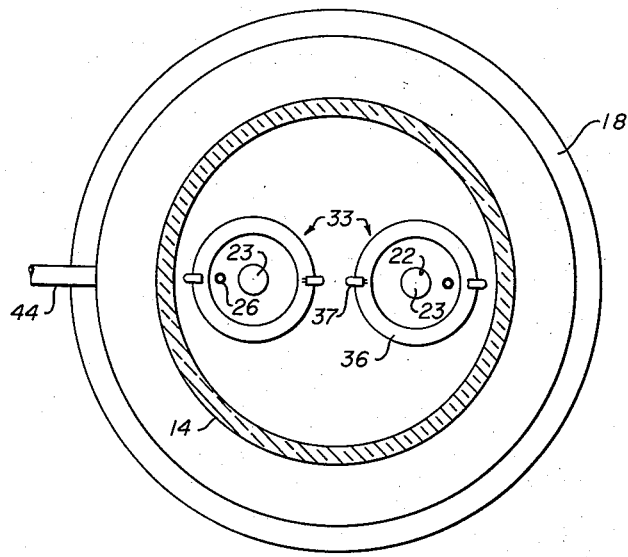
Figure 2 is a cross-section view taken along line 2—2 of Figure 1.

As shown in Figures 1 and 2, the top end of the sidewall 14 is flanged to form an annular rim 18. The rim serves as a stable support for a circular top plate 19, which top plate has on the lower peripheral surface thereof an annular indentation 21 superimposable over the annular rim 18. The top plate 19, in this instance composed of stainless steel, rests snugly on the rim 18 and closes the top of the vessel 12, thus preventing foreign particles from entering and contaminating the interior of the vessel.

In order that bubbles formed in the vessel 12 may be observed and photographed, preferably by stereo techniques, the top plate 19 is provided with two spaced apart annular viewing apertures 22 into which are fitted eyepieces 23, in this embodiment two camera lenses. Tubular gas escape vents 26 are also provided in the top plate 19, the vents being fitted into passages 24 which transpierce the top plate. The vents 26 serve to prevent the formation of gas pockets inside the top region of the vessel 12 and inside flow conduits and other related apparatus hereinafter to be described.

Also forming an integral structural component of the vessel 12 is an annular overflow trough 27, which encircles the top end portion of the vessel sidewall 14, the trough being formed by an annular, glass bottom plate 28; an outer, annular, glass sidewall 29; the vessel sidewall 14; and the bottom surface of the rim 18. Passages 31 transpiercing the vessel sidewall 14 at the top of the trough 27 provide passage for fluid flow from the vessel 12 into the trough. The function of the trough is to receive fluid from the top of the vessel 12, which function will hereinafter be explained in relation to the fluid recirculation system hereinafter described.

Figure 3:
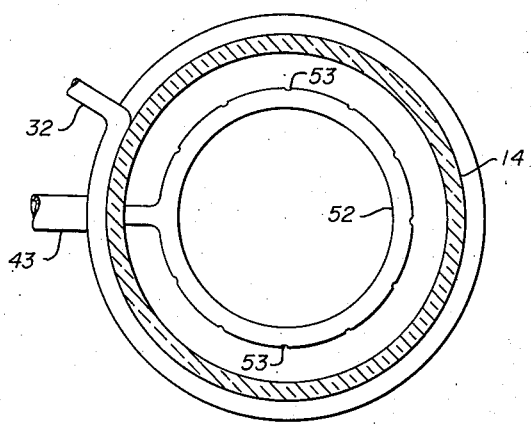
Figure 3 is a cross-section view taken along line 3—3 of Figure 1.

As shown in Figures 1, 2, and 3, in order that a thermal gradient be established between the top and the bottom portions of the vessel 12, a cooling element 32 is disposed at the bottom end of the vessel and heating elements 33 are disposed at the top end thereof.

The cooling element 32, which is best shown in Figure 3, comprises, in the present embodiment, refrigerant coils which coils 32 are disposed against the vessel bottom endwall 13 and the lower portion of the vessel sidewall 14 thereby establishing a cold temperature uniformly through the entire bottom region of the vessel 12. The refrigerant coils 32 are supplied with a suitable coolant from a temperature regulated coolant supply 34 (see Figure 1). In the present embodiment, the bottom portion of the vessel 12 is maintained at a constant temperature of −78° C., this being the Dry Ice temperature of carbon dioxide. It should be understood that, in other embodiments of the invention, the refrigerant coils 32 can be disposed inside the bottom portion of the vessel 12, or other methods of cooling can be used.

As best shown in Figure 2, the heating element 33 consists of two annular electrical coils 36, each coil being separately suspended from the top plate 19 by supports 37, which supports are, in this instance, composed of hollow tubular glass. The plane of each coil 36 is parallel to the top plate 19 and is concentric with the longitudinal axis of an eyepiece 23, such an arrangement providing an unobstructed view of the interior of the vessel 12 as seen through an eyepiece 23 while at the same time distributing heat across a substantial cross-sectional area of the vessel. The coils 36 are connected in series to a current source 38, shown in Figure 1, by insulated leads 39. The leads from the current source are connected with terminals 41 fitted into a removable insulating top portion 42 of the top plate 19, which top portion when removed provides access to the top ends of the inner tubular supports 37 through which supports the leads 39 continue and connect with the coils 36. Connections may be lead to the coils 36 in any convenient manner that does not contaminate the interior of the vessel 12. The coils 36 may be either glass enclosed, as here shown, or bare but should in any event be clean. Various types of heating elements may be used provided that the element used does not contaminate the fluid and does not obstruct the view from the eyepieces 23 into the interior of the vessel 12.

Referring again to Figure 1 in particular, and considering now the means by which fluid is circulated through the vessel 12, there is shown an insulated, glass inlet conduit 43 entering the vessel through an opening 40 in the bottom sidewall thereof in the region of the refrigerant coils 32. Inside the vessel 12, the inlet conduit 43 is joined to a hollow tubular glass ring 52 which ring is provided with apertures 53 spaced around the side thereof, the apertures serving to uniformly disperse the fluid 46 into the bottom portion of the vessel 12, and thereby avoid fluid turbulence which could distort bubble formations.

At the top of the vessel above the heating coils 36 is an outlet conduit 44 connecting with the lower portion of the overflow trough 27. Fluid 46 overflowing into the trough 27 through the vessel sidewall passages 31 is pumped out of the trough 27 via the outlet conduit 44 by a constant delivery pump 47 which pump maintains a constant flow throughout the system. Before reaching the pump 47, the fluid 46 in the outlet conduit 44 first fills a liquid receiving reservoir 48, which in the present embodiment serves to provide an excess of fluid in the system, to compensate for any evaporation or leakage, or blockage of fluid. From the outlet of the pump 47 the fluid 46 enters a temperature-regulated saturator 49, into which device gas is admitted from a pressurized gas supply 51, in this instance a tank of pressurized carbon dioxide. The saturator 49 causes the fluid 46, such as tributyrin, to be saturated with the gas at the same temperature as the refrigerated region of the vessel 12. The saturated fluid 46 is pumped from the saturator 49 through the inlet conduit 43 into the glass ring 52 and out the apertures 53 thereof into the bottom portion of the vessel 12.

In operation, the vessel 12 is initially filled with the gas-saturated fluid 46. Liquid is first pumped from the receiving reservoir 48 by the pump 47 via the inlet conduit 43 into the temperature regulated saturator 49. Here gas entering from the pressurized gas supply 51 is mixed into the liquid at a temperature substantially the same as that of the refrigerant coils 32 region until a state of saturation obtains in the liquid. The same degree of saturation is maintained in the fluid 46 after it is pumped into the bottom region of the vessel 12, as the fluid entering that region from the saturator 49 is maintained at the same temperature by the refrigerant coils 32. Energizing the heating coils 36 produces gradually increasing temperature in the fluid 46 toward the top region of the vessel 12. As the solubility of the gas in the saturated fluid 46 decreases with increasing temperature, high internal gas pressures exist in the fluid above the refrigerant coil 32 region. An ionizing radiation beam 17 entering the vessel 12 in this region causes the gas to evaporate from the fluid 46 in the form of bubbles, which bubbles ultimately rise to the top of the vessel 12 and escape through the gas escape vents 26 in the top plate 19. The fluid 46, being continuously supplied to the bottom of the vessel, drains out the passages 31 into the overflow trough 27, and on out through the outlet conduit 44 back to the receiving reservoir 48, and is then recirculated through the bubble chamber 11 apparatus by the pump 47. The bubbles produced by the ionizing radiation beam 17 can be viewed or photographed through the eyepieces 23, and provide data concerning the beam and the nuclear interactions resulting therefrom, as in conventional bubble chambers.

It will be appreciated that the apparatus herein described may be modified in various ways without departing from the basic concept of the invention. For example, instead of circulating a fluid through the system by the use of pumping means and associated conduits, the vessel may, prior to the operation of the apparatus, be filled with a gas-saturated liquid. The fluid in the supersaturated region established by the aforementioned thermal gradient will be radiation sensitive until the gas evaporates from the liquid.

If it is desired that radiation sensitivity be continued without the employment of a pump, liquid reservoir, saturator, etc., then a pressurized gas supply may be communicated directly with the bottom region of the vessel, the gas saturating the liquid in that region at a temperature regulated by the refrigerant element.

A temperature regulated gas-saturated liquid reservoir can be communicated with the vessel and with pumping means and will eliminate the necessity for using a saturator and separate liquid and gas supplies. The fluid can be recirculated through the reservoir until enough gas escapes from the liquid to warrant replenishing the reservoir with fresh fluid.

Means for establishing a thermal gradient through the vessel may take various forms. For example, ambient room temperature may be substituted for heating coils provided the gas-saturated liquid in the cold end of the vessel is sufficiently colder than room temperature. Or if the selected liquid and gas combination provides sufficient saturation of the gas in the liquid at ambient room temperature, room temperature then functions as the cooling element, and a sufficiently hotter heating element is employed to establish a thermal gradient in the vessel. Possible cooling elements include a cold bath surrounding the bottom region of the vessel. Various other standard refrigerant means well known in the cryogenics art can be used, depending on the design requirements of the apparatus. Electrical heating elements may be plates or rods instead of coils. An obvious alternative to electrical heating is the use of hot water coils.

While the invention has been disclosed with respect to a single preferred embodiment, it will be apparent to those skilled in the art that numerous variations and modifications may be made within the spirit and scope of the invention and thus it is not intended to limit the invention except as defined in the following claims.

What is claimed is:

1. In apparatus for the detection of ionizing radiation, the combination comprising a vessel, a gas-saturated liquid contained within said vessel, and means establishing a thermal gradient across a selected region of said liquid within said vessel, said thermal gradient having a temperature range including the saturation temperature of said liquid and including temperatures in excess of said saturation temperature thereby establishing a supersaturated region within said liquid whereby said ionizing radiation produces gas bubbles within said region of said liquid.

2. In apparatus for the detection and observation of ionizing radiation, the combination comprising a vessel, a gas-saturated liquid contained within said vessel, and means establishing a thermal gradient between an upper and lower region within said vessel, said thermal gradient having a temperature range including the saturation temperature of said liquid and including temperatures in excess of said saturation temperature thereby establishing a supersaturated region within said liquid whereby said ionizing radiation produces gas bubbles within said region of said liquid.

3. In apparatus for the detection and observation of ionizing radiation, the combination comprising a vessel, means continually supplying said vessel with a gas-saturated liquid, and means establishing a thermal gradient across a region of said liquid to be traversed by said ionizing radiation, said thermal gradient having a temperature range including the saturation temperature of said liquid and including temperatures in excess of said saturation temperature thereby establishing a super-saturated region within said liquid whereby said ionizing radiation produces gas bubbles within said region of said liquid.

4. In apparatus for the detection of ionizing radiation, the combination comprising a vessel, a gas-saturated liquid contained within said vessel, and a cooling element cooling at least one region of said liquid, said cooling element having a temperature substantially at least as cold as the saturation temperature of said liquid thereby establishing a thermal gradient in said liquid whereby a supersaturated region obtains within said liquid and said ionizing radiation traversing said supersaturated region produces visible gas bubbles therein.

5. A bubble chamber radiation detector apparatus comprising in combination, a vessel receiving ionizing radiation, a gas-saturated liquid contained within said vessel, and a heating element heating at least one region of said liquid, said heating element having a temperature higher than the saturation temperature of said liquid thereby establishing a thermal gradient in said liquid whereby a supersaturated region obtains within said liquid and said ionizing radiation traversing said supersaturated region produces visible gas bubbles therein.

6. A continuously sensitive radiation detector of the bubble chamber class comprising, in combination, a vessel receiving ionizing radiation, a source of refrigerated gas-saturated liquid, a conduit connecting said source of liquid with said vessel, means forcing a flow of said liquid from said source to said vessel, a first temperature regulating element acting on the upper region of said vessel, said first temperature regulating element having a temperature exceeding the saturation temperature of said liquid, and a second temperature regulating element acting on the lower region of said vessel, said second temperature regulating element having a temperature at least as low as the saturation temperature of said liquid whereby a radiation sensitive supersaturated zone is permanently established in the central portion of said vessel.

7. In a bubble chamber charged-particle detector apparatus, the combination comprising a vessel receiving ionizing radiation, means supplying said vessel with refrigerated gas-saturated liquid, a refrigerant element acting on a first region of said vessel said refrigerant element having a temperature at least as cold as the gas saturation temperature of said liquid, and a heating element acting on a second region of said vessel, said heating element having a temperature higher than said gas saturation temperature of said liquid thereby establishing a thermal gradient in said liquid whereby a supersaturated region obtains therein and said ionizing radiation traversing said supersaturated region produces visible gas bubbles therein.

8. In a continuously sensitive radiation detector of the bubble chamber class, the combination comprising a vessel receiving ionizing radiation, a source of gas-saturated liquid, a conduit connecting said source of liquid with the lower region of said vessel, means forcing a flow of said liquid from said source to said vessel, an electrical resistance heating element disposed in the upper region of said vessel and having a temperature exceeding the saturation temperature of said liquid, and a temperature controlling means acting on the lower region of said vessel and having a temperature at least as low as the saturation temperature of said liquid whereby a thermal gradient is established in the central region of said vessel, said thermal gradient resulting in a permanently radiation sensitive supersaturation zone within said vessel.

9. A continuously sensitive radiation detector of the bubble chamber class substantially as described in claim 8 wherein said temperature controlling means comprises a tubular coolant coil disposed against the lower portion of said vessel in thermal contact therewith, and means circulating a refrigerant through said coil.

10. A continuously sensitive radiation detector of the bubble chamber class substantially as described in claim 8 wherein said liquid is selected from the group: isoamyl acetate, methanol, ethanol, acetone, and tributyrin, which liquid is saturated with carbon dioxide gas.

11. A continuously sensitive radiation detector of the bubble chamber class comprising a vessel having a liquid inlet opening at the lower region and a liquid outlet opening at the upper region, a gas saturated liquid contained within said vessel, a pump having an inlet communicated with said liquid outlet opening of said vessel and having an outlet connected with said liquid inlet opening of said vessel whereby liquid is continuously circulated through said vessel, a refrigerated element acting on the lower region of said vessel and having a temperature at least as low as the saturation temperature of said liquid, and a heating element acting on the upper region of said vessel, said heating element having a temperature exceeding the saturation temperature of said liquid whereby a radiation sensitive supersaturated region is established in the central region of said vessel.

12. A radiation detector of the bubble chamber class which is continuously sensitive and operable at atmospheric pressure, comprising, in combination, a vessel having an inlet opening proximal to the bottom and an outlet opening proximal to the top, said vessel further being vented to the atmosphere at the top and having at least one area comprised of transparent material whereby the interior of said vessel may be viewed, a gas saturated liquid substantially filling said vessel, a pump having an inlet connected with said outlet opening of said vessel and an outlet connected with said inlet opening of said vessel whereby said liquid is continually recirculated through said vessel and moves upwardly therein, a refrigerated element thermally contacting the lower region of said vessel and having a temperature at least as low as the saturation temperature of said liquid, and a heating element thermally contacting the upper region of said vessel and having a temperature exceeding the saturation temperature of said liquid whereby a radiation sensitive supersaturated zone is established within the center region of said vessel.

No references cited.